United States Patent
Mitsui

[11] 3,889,662
[45] June 17, 1975

[54] ENDOSCOPE

[75] Inventor: Kazuhiko Mitsui, Tokyo, Japan

[73] Assignee: Olympus Optical Co., Ltd., Tokyo, Japan

[22] Filed: May 24, 1974

[21] Appl. No.: 472,988

[30] Foreign Application Priority Data
May 31, 1973   Japan.................................. 48-64209

[52] U.S. Cl.................................... 128/6; 350/96 B
[51] Int. Cl................................................. A61b 1/06
[58] Field of Search................ 128/4, 5, 6, 7, 8, 11; 350/96 B

[56] References Cited
UNITED STATES PATENTS
3,068,772   12/1962   MacNeille.......................... 350/96 B
3,556,085   1/1971   Takahashi............................... 128/6

*Primary Examiner*—Richard A. Gaudet
*Assistant Examiner*—Henry S. Layton

[57] ABSTRACT

Two image guiding fiber bundles are disposed within an endoscope with the base end portions thereof secured together within the proximal end section of the endoscope. A common eyepiece is arranged opposite to the base end surface of the fiber bundles. One image of the interior wall of a body organ of a patient is transmitted, through a view window opened at the front end surface of the distal end section of the endoscope, to the forward end of one fiber bundle, while another image of the interior wall of the body organ is transmitted, through another view window opened at the side end surface of the distal end section, to the forward end of the other fiber bundle. Both the images transmitted through the forward ends of the fiber bundles to the base end surfaces of the fiber bundles are simultaneously observed through the common eyepiece.

8 Claims, 7 Drawing Figures

ENDOSCOPE

This invention relates to an endoscope and more particularly to an endoscope having a plurality of image guiding fiber bundles disposed therein.

With a conventional endoscope a set of objective lenses is arranged within the distal end section. An image of the interior wall of a body cavity of a patient is transmitted from a view window, through a single image guiding fiber bundle disposed along the length of the flexible tube section of the endoscope, to an eyepiece arranged within the proximal end section of the endoscope. The image is observed through the eyepiece. There are well known a "forward view" type endoscope whose view window is opened at the front end surface of the distal end section, and a "side view" type endoscope whose view window is opened at the side end surface of the distal end section. With such conventional endoscope, however, difficulty is presented in guiding the distal end section into the internal wall of the body cavity or body organ. Since the view window is provided either at the front end surface of the distal end section or at the side end surface of the distal end section, it is impossible to observe the internal wall of the body cavity from the overall point of view. Furthermore, there is a fear that the distal end section will hit against the internal wall of the body cavity. In the worst case, injury to the internal wall of the body cavity will result. For this reason, a very careful operation is required in inserting the distal end section of the endoscope into the body cavity and, therefore, the inserting operation can not speedily effected.

With an endoscope, in particular, equipped with a lens system for amplification only, the field of vision is made narrowed and a general situation of a body cavity can not be fully observed. Furthermore, the above-mentioned drawbacks are encountered in guiding the distal end section of the endoscope into the body cavity.

An endoscope incorporating a zoom lens as a lens system is also known. In this endoscope, a zoom ratio can be suitably varied during the insertion of the distal end section into a body cavity. However, the field of vision is restricted. Moreover, a cumbersome operation is needed in adjustably varying the zoom ratio and a resolving power is lowered. The construction of the distal end section is also complicated and a failure is liable to occur.

Within an endoscope according to this invention at least two image guiding fiber bundles are disposed. The base end portions of the fiber bundles meet within the proximal end section and are secured together with image delivering end surfaces thereof placed on the same plane. The so secured image delivering end surfaces of the fiber bundles are arranged opposite to a common eyepiece. The forward ends of the respective fiber bundles receive respective images of the interior wall of a body organ or body cavity through respective view windows separately opened at the front end surfaces of the distal end section of the endoscope. In one aspect of this invention view windows are opened one at the front end surface of the distal end section and one at the side end surface of the distal end section, and the front and side images received by and transmitted through the view windows to the fiber bundles can be simultaneously observed through a common eye-piece.

The endoscope according to this invention is free from the above-mentioned drawbacks as encountered in the prior are endoscope. That is, the distal end section of the endoscope can be readily guided into a body cavity without injury to the inner wall of the body cavity and any affected portion of the body cavity can be easily spotted and observed.

According to one embodiment of this invention two view windows are separately opened at the front end surface of a distal end section. One image is received by and transmitted from one view window through a set of wide angle objective lenses to the forward end of one fiber bundle, while another image is received by and transmitted from the other view window through a set of amplifying objective lenses to the forward end of the other fiber bundle. The two images appearing at the image delivering end surfaces of the fiber bundles can be simultaneously observed through a common eyepiece. Consequently, the interior of a body organ can be wholly and locally observed through the common eyepiece. According to this endoscope, there is encountered no difficulty as is found in the conventional endoscope equipped with a zoom lens.

According to another aspect of this invention two images are transmitted, through a single common view window opened at the front end surface of a distal end section, one to a set of wide angle objective lenses and one to a set of amplifying objective lenses. Since no greater space is taken up at the front end surface of the distal end section, for example, an illumination window, port for forceps etc. can be easily arranged at the front end of the distal end section.

Accordingly, a primary object of this invention is to provide an endoscope capable of readily guiding the distal end section into a body cavity without injury to the internal wall of the body cavity.

Another object of this invention is to provide a stably operable, trouble-free endoscope simple in construction.

This invention can be more fully understood from the following detailed description when taken in connection with the accompanying drawings, in which.

Figure 1:
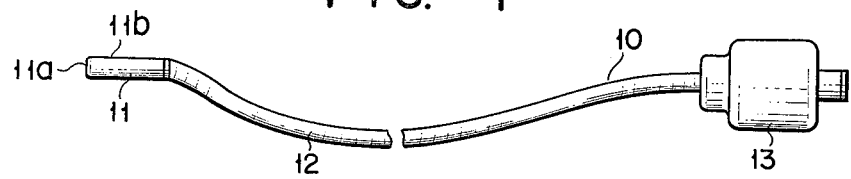
FIG. 1 is a general side view showing an endoscope according to this invention.

FIG. 1 shows an endoscope 10 similar in appearance to an endoscope in general. The endoscope 10 consists of a distal end section 11, flexible tube section 12 and proximal end section 13. The distal end section 11 is inserted into the body cavity or the body organ of a patient. The flexible tube section 12 is connected to one end of the distal end section 11 to permit the distal end section 11 to be guided into the body cavity. The other end of the flexible tube section 12 is connected to the proximal end section 13 for controlling the direction in which the distal end section 11 is inserted. The proximal end section 13 is generally referred to as a control unit.

Figure 2:
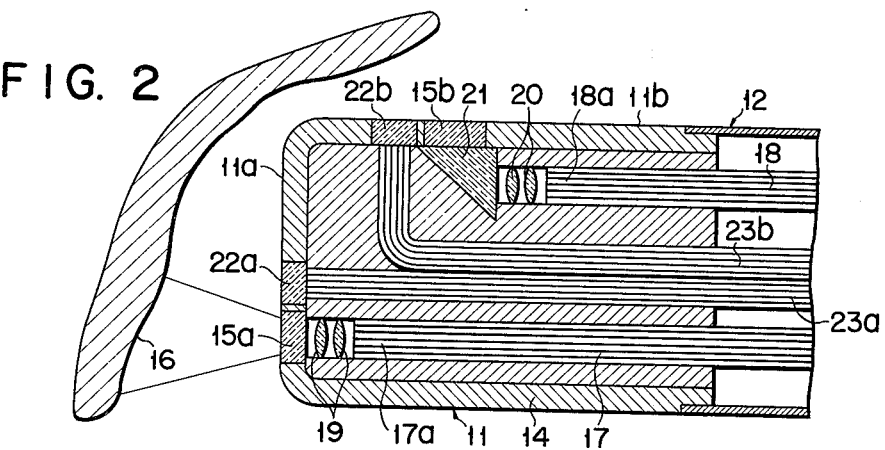
FIG. 2 is an enlarged, cross-sectional side view showing the distal end section of the endoscope of FIG. 1.
Figure 3:
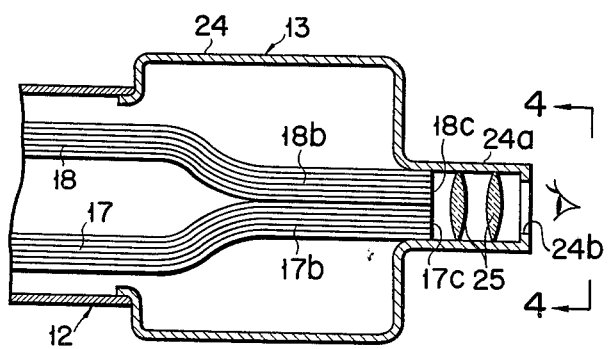
FIG. 3 is an enlarged, cross-sectional view showing the proximal end section of the endoscope of FIG. 1.
Figure 4:
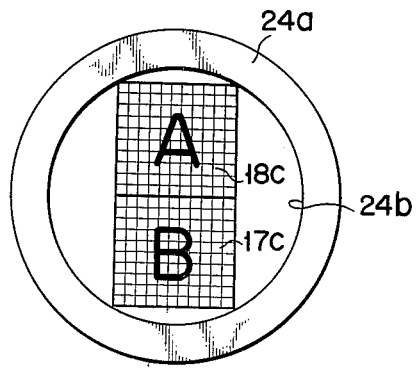
FIG. 4 is an enlarged view taken along a line of 4—4.
Figure 5:
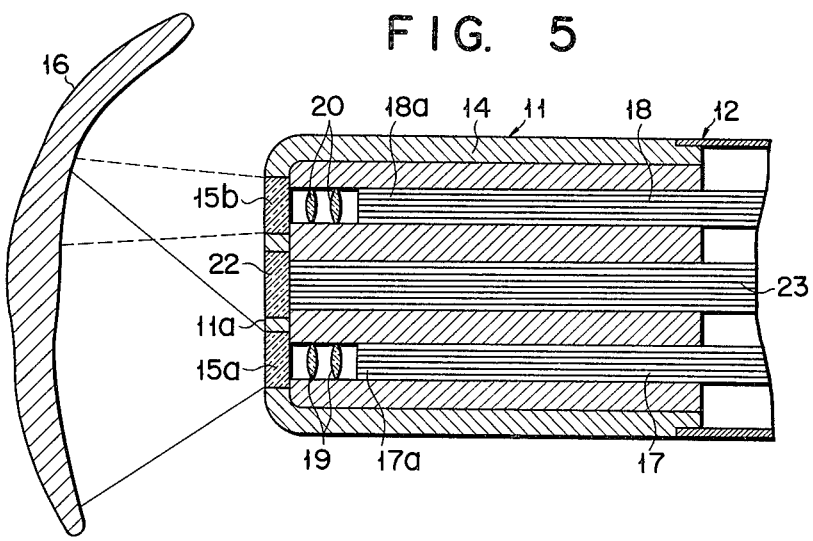
FIG. 5 is an enlarged, cross-sectional side view showing the distal end section of a second embodiment according to this invention.
Figure 6:
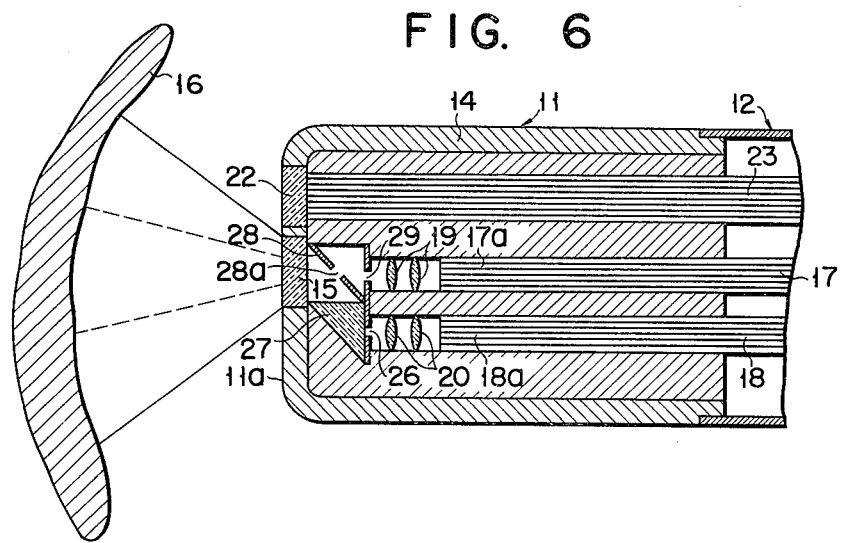
FIG. 6 is an enlarged, cross-sectional side view showing the distal end section of a third embodiment according to this invention.

With embodiments shown in FIGS. 5 and 6 the same reference numerals are employed to indicate parts or elements corresponding to those shown in FIGS. 2 to 4.

The distal end section 11 of the endoscope of FIG. 1 includes a casing 14 having a front end surface 11a and side end surface 11b. A view window 15a is located at the front end surface of the distal end section 11, while another view window 15b is positioned at the side end surface of the distal end section 11. The view windows 15a and 15b, each, consist of a cover glass fitted into a hole provided in the casing 14. The view windows 15a and 15b, each, act as receiving means for receiving and transmitting the image of the internal wall 16 of the body cavity toward the interior of the distal end section 11.

Two image guiding fiber bundles 17 and 18, each, have a large number of fibers and are disposed parallel to each other within the distal end section 11 and flexible tube section 12. One end 17a of the fiber bundle 17 leads to the view window 15a through a set of objective lenses 19 arranged closer to each other, while one end 18a of the fiber bundle 18 leads to a view window 15b through a set of objective lenses 20 and then through a prism 21. The images of the internal wall 16 of the patient's body cavity are optically transmitted from the view windows 15a and 15b through the optical means 19, 21 and 20 to the forward ends 17a and 18a of the respective fiber bundles 17 and 18.

An illumination window 22a is located at the front end surface 11a of the distal end section 11 and in proximity to the view window 15a, while another illumination window 22b is positioned at the side surface 11b of the distal end section 11 and in proximity to the view window 15b. One end of a light guide 23a is connected to the view window 22a and one end of a light guide 23b is optically connected to the view window 22b. The respective light guides 23a and 23b extend from the distal end section 11 through the flexible tube section 12 to the proximal end section 13, where they are connected to a light source, not shown. The arrangement is similar to that of an endoscope in general and any detailed explanation is, therefore, omitted.

As shown in FIG. 3, a set of eyepieces 25 is located within a projected portion 24a of a casing 24 of the proximal end section 13. The base end portions 17b and 18b of the fiber bundles 17 and 18 meet within the proximal end section 13 of the endoscope and are secured together as shown in FIG. 3. The so secured base end portions of the fiber bundles 17 and 18 extend toward the eyepieces 25 with the image transmitting end surfaces 17c and 18c thereof placed in the same plane. As a result, images optically transmitted from the forward ends 17a and 18b of the fiber bundles 17 and 18 emerge, for example, as B and A, from the image transmitting end surfaces 17c and 18c, respectively, as shown in FIG. 4. That is, both the images B and A can be simultaneously observed through the eyepieces 25 and then through an opening 24b of the casing 24. The observer can controllably insert the distal end section of the endoscope into the body cavity of the patient while observing the front and side images transmitted through the front and side view windows 15a and 15b.

This embodiment constitutes a combination of a "forward view" type endoscope and "side view" type endoscope.

FIG. 5 shows a distal end section 11 of a second embodiment according to this invention. In this embodiment, two view windows 15a and 15b are provided, at a predetermined interval, at the front end surface 11a of the distal end section 11. The view windows 15a and 15b, each, consist of a cover glass fitted into a hole provided in the front end surface of the distal end section 11. This embodiment constitutes a forward view type endoscope. The forward ends 17a and 18a of two image guiding fiber bundles 17 and 18 are parallelly disposed at a predetermined interval within the distal end section 11. The forward end 17a of the image guiding fiber bundle 17 leads to the view window 15a through a set of objective lenses 19, while the forward end 18a of the image guiding fiber bundle 18 leads to the view window 15b through a set of objective lenses 19. The images of the internal wall 16 of the body cavity are optically transmitted from the view windows 15a and 15b through respective optical means 19 and 20 to the forward ends 17a and 18a of the fiber bundles 17 and 18. Wide angle lenses are used as the objective lenses 19 constituting one optical means and, therefore, an image covering a wide field of vision is transmitted to the fiber bundle 17. Amplifying lenses are used as the objective lenses 20 constituting the other optical means and, as shown in broken lines in FIG. 5, an image covering a narrow field of vision is transmitted in an enlarged form to the forward end 18a of the fiber bundle 18.

An illumination window 22 is located in that front end surface 11a of the distal end section 11 which is intermediate between the view windows 15a and 15b. One end of a light guide 23 is connected to the view window 22. The light guide 23 is disposed, substantially parallel to the two fiber bundles 17 and 18, within the distal end section 11 of the endoscope. The other end of the light guide 23 extends through a flexible tube section 12 into a proximal end section 13 where it is connected to a light source, not shown. In this embodiment the proximal end section 13 is similar in construction to that shown in FIG. 3. Consequently, two images can be simultaneously observed through a single optical observing means i.e., a set of eyepieces and the observer can controllably insert the distal end section of the endoscope, while observing wholly and locally the internal wall of the body cavity of the patient.

FIG. 6 shows a third embodiment according to this invention. A single view window 15 is provided at the front end surface 11a of a casing 14. The view window 15 consists of a cover glass fitted into a hole provided in the front end surface of the casing 14. As will be easily understood from FIG. 6, this embodiment belongs to a forward view type endoscope.

Two image guiding fiber bundles 17 and 18 are parallelly disposed at a predetermined interval within the distal end section 11. Sets of objective lenses 19 and 20 are located in proximity to the forward ends 17a and 18a of the fiber bundles 17 and 18, respectively. Ahead of the objective lenses 20, a stop 26, a prism 27 and a reflecting mirror 28 are sequentially optically arranged. At the center of the reflecting mirror an aperture 18a is provided. In front of the objective lenses 19, a stop 29 is provided. A set of amplifying lenses are used as the objective lenses 20, while a set of wide angle lenses are used as the objective lenses 19.

An image covering that field-of-vision area of the internal wall 16 of a body cavity which is defined by broken lines in FIG. 6 is transmitted through the view window 15 to the reflecting mirror 28 where it is polarized toward the prism 27. The image is further transmitted from the prism 27 through the stop 26 to the objective lenses 20 and then to the forward end 18a of the fiber bundle 18.

An image covering that field-of-vision area of the internal wall 16 of the body cavity which is defined by solid lines is transmitted from the view window 15 through the aperture 28a of the reflecting mirror and the stop 29 to the objective lenses 19 and then to the forward end 17a of the fiber bundle 17.

An illumination window 22 is positioned at that front end surface of the distal end section 11 which is in proximity to the view window 15. One end of a light guide 23 is connected to the illumination window 22. The light guide 23 is disposed, substantially parallel to the fiber bundles 17 and 18, within the distal end section 11 of the endoscope. The other end of the light guide 23 extends through the flexible tube section 12 into the proximal end section 13, as in the above-mentioned embodiments, where it is connected to a light source.

The base end portions of the fiber bundles 17 and 18 extend through the flexible tube section 12 into the proximal end section 13 where they meet and are secured together, as shown in FIG. 3, with the base ends thereof placed in the same plane. This arrangement is omitted, since it is similar to the first embodiment of this invention.

With this embodiment the interior of the body organ can be observed wholly and locally through a single optical means i.e., a set of eyepieces. Since only one view window 15 is provided in this embodiment, no greater space is taken up at the front end surface of the distal end section 11. This makes it easy to provide the illumination window 22, port for a pair of forceps, and so on at the front end surface of the distal end section. Furthermore, clear images are optically transmitted to the respective fiber bundles 17 and 18 due to the presence of the stops 26 and 29. From design consideration it is very easy to apply the technical concept embodied in this embodiment to a side view type endoscope.

Figure 7:
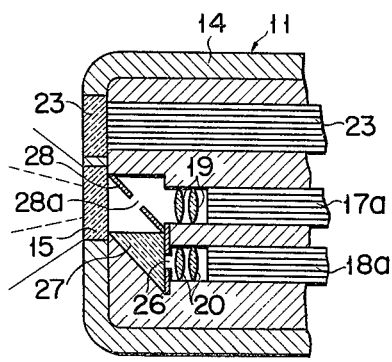
FIG. 7 is an enlarged, cross-sectional side view showing the distal end section of a fourth embodiment according to this invention.

FIG. 7 shows a fourth embodiment according to this invention. This embodiment is identical to the third embodiment, except that no stop 29 is provided. In the arrangement of FIG. 7, an aperture 28a of a reflecting mirror 28 functions not only as an image transmitting means but also as a stop. With this embodiment an image will be somewhat affected in its sharpness as compared with the third embodiment.

However, such stop 29 as shown in the third embodiment can be omitted in this embodiment. This will lead to a simplified construction and reduced cost.

Though two fiber bundles are used in the above-mentioned embodiments, three or more fiber bundles can be used as required. It will be understood that an endoscope having three or more fiber bundles also falls within the spirit and scope of this invention.

What is claimed is:

1. An endoscope having a distal end section and a front end surface and a side end surface and being adapted to be inserted into a body cavity, a flexible tube section having one end connected to the distal end section so as to facilitate guiding the distal end section into the body cavity, and a proximal end section connected to the other end of the flexible tube section so as to control the insertion of the distal end section, said endoscope comprising:

a. first and second image guiding fiber bundles having forward ends and base end portions extending respectively from the distal end section through the flexible tube section into the proximal end section to permit images of the internal wall of the body cavity to be transmitted from the respective forward ends thereof to the respective base end portions thereof, said base end portions of the first and second fiber bundles having respective image delivering end surfaces;

b. receiving means provided at the distal end section so as to receive the images into the distal end section;

c. first and second optical means provided, in proximity to the respective forward ends of the first and second image guiding fiber bundles, within the distal end section to optically transmit the images from the receiving means to the respective forward ends of the first and second fiber bundles; and d. a single optical observing means provided within the proximal end section and optically connected to the base end portions of the first and second fiber bundles to permit both the images from the receiving means to be simultaneously observed from the outside;

e. said receiving means including a first view window opened at the front end surface of the distal end section and a second view window opened at the side end surface of the distal end section, said first and second view windows optically leading to said first and second optical means, respectively.

2. An endoscope according to claim 1, in which said first optical means includes a first objective lens and said second optical means includes a second objective lens and a prism.

3. An endoscope according to claim 1, in which said first optical means includes a first objective lens and said second optical means includes a second objective lens.

4. An endoscope according to claim 3, in which either one of said first and second objection lenses is a wide angle lens.

5. An endoscope according to claim 3, in which either one of said first and second objective lenses is an amplifying lens.

6. An endoscope having a distal end section having a front end surface and a side end surface and being adapted to be inserted into a body cavity, a flexible tube section having one end connected to the distal end section so as to facilitate guiding the distal end section into the body cavity, and a proximal end section connected to the other end of the flexible tube section so as to control the insertion of the distal end section, said endoscope comprising:

a. first and second image guiding fiber bundles having forward ends and base end portions extending respectively from the distal end section through the flexible tube section into the proximal end section to permit images of the internal wall of the body cavity to be transmitted from the respective forward ends thereof to the respective base end portions thereof, said base end portions of the first and second fiber bundles having respective image delivering end surfaces;
b. receiving means provided at the distal end section so as to receive the images into the distal end section and including a single view window opened at the front end surface of the distal end section;
c. first and second optical means provided, in promimity to the respective forward ends of the first and second image guiding fiber bundles, within the distal end section to optically transmit the images from the receiving means to the respective forward ends of the first and second fiber bundles, said first optical means including a first objective lens which is a wide angle lens and said second optical means including a second objective lens which is an amplifying lens, a prism and a reflecting mirror having an aperture; and
d. a single optical observing means provided within the proximal end section and optically connected to the base end portions of the first and second fiber bundles to permit both the images from the receiving means to be simultaneously observed from the outside, whereby one image is transmitted from said single view window through the reflecting mirror and the prism to the second objective lens, while at the same time another image is transmitted from the single view window through the aperture of the reflecting mirror to the amplifying lens.

7. An endoscope according to claim 6, in which said first optical means further includes a first stop and said second optical means includes a second stop.

8. An endoscope according to claim 6, in which the aperture of said reflecting mirror serves as a stop for the first objective lens.

* * * * *